UNITED STATES PATENT OFFICE.

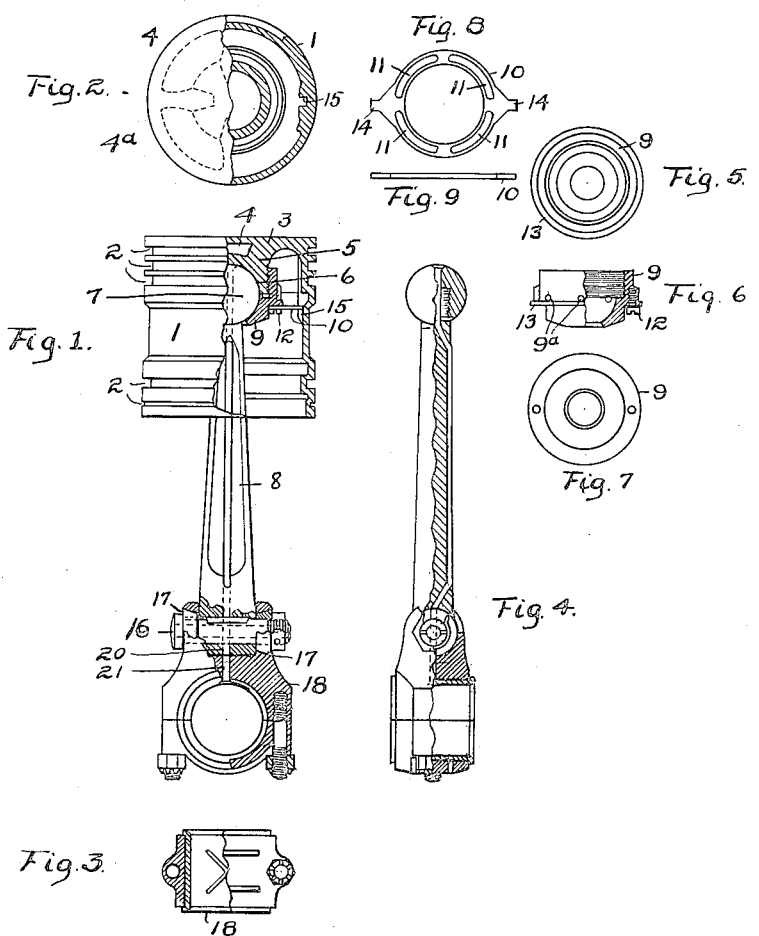

HAROLD M. LOCHRANE, OF FORT WAYNE, INDIANA.

ENGINE.

1,384,200. Specification of Letters Patent. Patented July 12, 1921.

Application filed May 23, 1919. Serial No. 299,330.

*To all whom it may concern:*

Be it known that I, HAROLD M. LOCHRANE, a citizen of the United States, residing at Fort Wayne, in the county of Allen and State of Indiana, have invented new and useful Improvements in Engines, of which the following is a specification.

The invention relates to engines and particularly to pistons and connecting rods for internal combustion engines. The object of the invention is to provide a simple and durable and highly efficient construction of piston and connecting rod adapted for use in various types of engine cylinders and I accomplish the same by the arrangement and construction and combination of parts illustrated in the accompanying drawings and hereinafter described.

In the drawings Figure 1 is an elevational view of the preferred form of piston and connecting rod partly in section; Fig. 2 a plan view of the same partly in section; Fig. 3 a plan view partly in section of the lower or inner end of the connecting rod; Fig. 4, an elevational view of the piston rod; Fig. 5 a plan view of the socketed nut of the piston; Fig. 6 a side elevational view of the same; Fig. 7 a bottom view of the same; Fig. 8 a plan view of the locking washer and Fig. 9 an edge view of the same.

Referring to the drawings, which illustrate an embodiment of the invention, 1 is the piston having peripheral grooves 2 to receive the usual packing rings. The piston is substantially hollow or cup-shaped, its end wall 3 having a cavity 4 therein and an inwardly projecting boss 5 having a spherical cavity or socket 6, in which socket, ball 7 threaded on connecting rod 8 articulates. A socketed nut 9 is in threaded engagement with the external face of boss 5 and is adapted to embrace the lower portion of ball 7 to complete the ball and socket joint between the piston and connecting rod. The nut 9 is secured in position by lock washer 10. The washer is slotted at 11 and bolts 12 pass through the slots and into threaded apertures in flange 13 of nut 9. Ears 14 on the washer are adapted to engage in grooves 15 in the wall of the piston. Slots 11 permit of the rotation of the nut on the boss for adjustment purposes since the bolts will travel in them as the nut is rotated, and when the nut is properly adjusted and the bolts tightened the laterally projecting ears on the washer which engage the grooves 15 prevent the further rotation of the nut on the boss.

The connecting rod consists of the rod 8 having a ball 7 in threaded engagement with its upper end. The lower end of the rod is apertured transversely to receive a wrist pin 16 mounted in suitable bearings 17 formed on the upper half of crank box 18. The wrist pin extends transversely or at right angles to the crank shaft which the crank box is adapted to receive, hence the piston is always in line with the cylinder no matter what position the crank shaft may be in—that is, whether the crank shaft is higher or lower at either end than it should be. This is made possible by the presence of the wrist pin on which the crank box is free to move endwise with the crank shaft to the altered position of the latter without disturbing the alinement of piston and cylinder.

Suitable lubrication for the ball and socket joint is provided by suitable channels and conduits leading from the crank box, through the wrist pin, the connecting rod and the ball, apertures 9ª in the socket nut providing for the escape of the lubricant therefrom. On each up-stroke of the piston the oil passages 20 and 21 are in alinement and lubricant is forced up to the ball and socket from which it drains through apertures 9ª.

The ball and socket joint is positioned at the extreme end of the piston and at the central point of that end so that the center line of force on the head of the piston strikes the connecting rod squarely on its top and avoids the so-called piston slap. The said joint enables the piston to run smoothly at any angle desired and to run truly in the cylinder, and the socket nut may be adjusted on boss 5 to produce any desired degree of tightness between the ball and the socket thereby eliminating wrist pin knocks or the replacement of new parts.

The cavity 4 and ribs 4ª in the piston head afford great strength with a minimum of weight of metal and, as shown, the piston wall is substantially of uniform thickness, so that the weight of metal is evenly distributed over the piston and affords uniform expansion thereof, the socket materially aiding in the distribution of the heat generated when the device is in operation.

What I claim is:

1. The combination with a piston having a ball socket within it, a crank box, a wrist pin mounted on the crank box, a connecting rod pivotally mounted at one end upon the wrist pin, a ball at the opposite end of the rod engaging the ball socket, a socketed nut removably engaging the ball socket and also engaging the ball, and a lock washer engaging the inner wall of the piston and adjustably secured to the socketed nut.

2. The combination with a piston having a ball socket within it and having a plurality of grooves formed in its inner base, a crank box, a connecting rod pivotally connected at one end to the crank box, a ball at the opposite end of the connecting rod engaged in the socket, a socketed nut engaging the ball and adjustably engaging the ball socket and a lock washer having projecting portions adapted to engage in the grooves in the piston and having a plurality of slots and revoluble means extending through the slots and engaged in the socketed nut for securing the nut to the washer in adjusted position.

HAROLD M. LOCHRANE.